(12) United States Patent
Chou et al.

(10) Patent No.: US 7,774,514 B2
(45) Date of Patent: Aug. 10, 2010

(54) METHOD OF TRANSMITTING DATA BETWEEN STORAGE VIRTUALIZATION CONTROLLERS AND STORAGE VIRTUALIZATION CONTROLLER DESIGNED TO IMPLEMENT THE METHOD

(75) Inventors: Teh-Chern Chou, Taipei Hsien (TW); Wei-Shun Huang, Taipei Hsien (TW)

(73) Assignee: Infortrend Technology, Inc., Chung-Ho, Taipei Hsien (TW)

( * ) Notice: Subject to any disclaimer, the term of this patent is extended or adjusted under 35 U.S.C. 154(b) by 370 days.

(21) Appl. No.: 11/383,502

(22) Filed: May 16, 2006

(65) Prior Publication Data
US 2006/0259650 A1 Nov. 16, 2006

Related U.S. Application Data

(60) Provisional application No. 60/594,898, filed on May 16, 2005.

(51) Int. Cl.
*G06F 13/38* (2006.01)
(52) U.S. Cl. .............................. 710/26; 710/22; 710/9
(58) Field of Classification Search ................ 709/226; 710/1, 240, 3, 74, 8, 100; 711/113, 114, 711/162, 165, 209, 3
See application file for complete search history.

(56) References Cited

U.S. PATENT DOCUMENTS

| | | | |
|---|---|---|---|
| 5,680,580 A | 10/1997 | Beardsley et al. | |
| 6,665,746 B1 | 12/2003 | Liong | |
| 6,681,238 B1 * | 1/2004 | Brice et al. | 718/1 |
| 6,725,289 B1 * | 4/2004 | Waldspurger et al. | 710/9 |
| 6,792,505 B2 | 9/2004 | Otterness et al. | |
| 6,845,403 B2 * | 1/2005 | Chadalapaka | 710/5 |
| 6,877,044 B2 * | 4/2005 | Lo et al. | 710/2 |
| 6,880,002 B2 * | 4/2005 | Hirschfeld et al. | 709/223 |
| 6,934,799 B2 * | 8/2005 | Acharya et al. | 711/112 |
| 7,043,622 B2 * | 5/2006 | Henry et al. | 711/203 |

(Continued)

FOREIGN PATENT DOCUMENTS

CN 1391672 1/2003

(Continued)

OTHER PUBLICATIONS

Massiglia, The RAID Book, 1997, The RAID Advisory Board Inc., pp. 55-62.*

(Continued)

*Primary Examiner*—Henry W. H. Tsai
*Assistant Examiner*—Cheng-Yuan Tseng
(74) *Attorney, Agent, or Firm*—Thomas, Kayden, Horstemeyer & Risley

(57) ABSTRACT

A method of transmitting data between storage virtualization controllers (SVCs) in a computer system is disclosed, in which there is an inter-controller communication channel (ICC) between the storage virtualization controllers. The method comprises the steps of: a central processing unit (CPU) of one storage virtualization controller (SVC) sending a data transfer request to an interface that establishes the ICC when the CPU needs to transmit information to the other SVC; and transmitting the information to the other SVC after the interface that establishes the ICC receives the data transfer request, and obtains the information.

19 Claims, 6 Drawing Sheets

U.S. PATENT DOCUMENTS

| | | | |
|---|---|---|---|
| 7,111,147 B1* | 9/2006 | Strange et al. | 711/209 |
| 7,155,546 B2* | 12/2006 | Seto | 710/100 |
| 7,171,434 B2 | 1/2007 | Ibrahim et al. | |
| 7,184,378 B2* | 2/2007 | Innan et al. | 369/47.23 |
| 7,234,037 B2* | 6/2007 | Errickson et al. | 711/202 |
| 7,240,143 B1* | 7/2007 | Scheffler et al. | 711/3 |
| 7,263,593 B2* | 8/2007 | Honda et al. | 711/205 |
| 7,281,072 B2* | 10/2007 | Liu et al. | 710/240 |
| 7,305,520 B2* | 12/2007 | Voigt et al. | 711/112 |
| 7,334,064 B2* | 2/2008 | Davies et al. | 710/62 |
| 7,334,076 B2* | 2/2008 | Hendel et al. | 711/6 |
| 7,376,770 B2* | 5/2008 | Arndt et al. | 710/62 |
| 7,437,511 B1* | 10/2008 | Nguyen et al. | 711/120 |
| 7,441,095 B2* | 10/2008 | Tamura et al. | 711/203 |
| 7,464,126 B2* | 12/2008 | Chen | 1/1 |
| 7,478,221 B1* | 1/2009 | Karr et al. | 711/203 |
| 7,484,210 B2* | 1/2009 | Lewites et al. | 718/1 |
| 7,525,957 B2* | 4/2009 | Scherer et al. | 370/360 |
| 7,620,774 B1* | 11/2009 | Waxman | 711/114 |
| 7,676,514 B2* | 3/2010 | Faibish et al. | 707/646 |
| 2004/0049580 A1* | 3/2004 | Boyd et al. | 709/226 |
| 2004/0153844 A1* | 8/2004 | Ghose et al. | 714/42 |
| 2004/0225775 A1 | 11/2004 | Pellegrino et al. | |
| 2005/0235132 A1* | 10/2005 | Karr et al. | 711/203 |
| 2005/0240805 A1* | 10/2005 | Schnapp et al. | 714/6 |
| 2006/0136688 A1 | 6/2006 | Pang et al. | |
| 2006/0143311 A1* | 6/2006 | Madukkarumukumana et al. | 710/1 |

FOREIGN PATENT DOCUMENTS

CN    1553346    12/2004

OTHER PUBLICATIONS

China Office Action mailed Jun. 1, 2007.
Office Action issued on Sep. 30, 2008 in U.S. Appl. No. 11/330,961.
"PCI-SIG PCI Express Frequently Asked Questions, Jul. 24, 2002" www.pcisig.com, pp. 1-4.

* cited by examiner

METHOD OF TRANSMITTING DATA BETWEEN STORAGE VIRTUALIZATION CONTROLLERS AND STORAGE VIRTUALIZATION CONTROLLER DESIGNED TO IMPLEMENT THE METHOD

CROSS-REFERENCE TO RELATED APPLICATION

This application claims priority to U.S. provisional application Ser. No. 60/594,898, filed May 16, 2005.

BACKGROUND OF THE INVENTION

1. Field of the Invention

The invention relates to a redundant storage virtualization subsystem, and in particular, to a method of transmitting data between redundant storage virtualization controllers in redundant storage virtualization subsystem.

2. Description of the Related Art

Storage virtualization is a technology that virtualizes physical storage space, which combines sections of physical storage devices (PSDs) into logical storage entities, herein referred to as logical media units (LMUs), which are made accessible to a host entity. Storage virtualization has been utilized primarily in Redundant Array of Independent Disks (RAID) technology, combining smaller physical storage devices into logical media units with high capacity, fault tolerance, and high performance.

A storage virtualization controller (SVC) is a device the primary purpose of which is to map combinations of sections of physical storage media to logical media units visible to a host entity. Input/output (I/O) requests received from the host entity are parsed and interpreted, and associated operations and data are translated into a physical storage device I/O requests. This process may be indirect with operations cached, delayed (e.g., write-back), anticipated (e.g., read-ahead), grouped, etc. to enhance performance and other operational characteristics. Therefore, the I/O requests of the host entity may not necessarily correspond to the physical storage device I/O requests in a one-to-one manner.

An external (or stand-alone storage virtualization controller) is a storage virtualization controller that is connected to the host entity via an I/O interface, and that can be connected to a device external to the host entity. External storage virtualization controllers operate independent of a host entity.

The primary motivation in configuring a pair of external storage virtualization controllers (SVCs) into a redundant pair is to allow continued, uninterrupted access to data by a host (or more than one host) even in the event of a malfunction or failure of a single storage virtualization controller. This is accomplished by incorporating functionality into the storage virtualization controllers that allow one controller to take over for the other in the event that the other malfunctions or becomes completely incapacitated.

Redundantly storage virtualization controller pair modes can be divided into two categories: active-standby and active-active modes. In active-standby mode, a storage virtualization controller (known as a primary storage virtualization controller) presents, manages, and processes all I/O requests for all LMUs in the storage virtualization subsystem, while the other storage virtualization controller (known as a secondary storage virtualization controller) stands by to take over in the event that the primary storage virtualization controller becomes handicapped or completely incapacitated. In active-active mode, both of the two storage virtualization controllers present, manage, or process the I/O requests of various logical media units present in the redundant storage virtualization subsystem concurrently. In active-active mode, both storage virtualization controllers are always ready to take over for other when a malfunction occurs in the other storage virtualization controller, causing it handicapped or completely incapacitated. Active-active mode typically provides better performance, since the resources of both storage virtualization controllers (e.g., central processing unit time, internal bus bandwidth) can be brought to bear in servicing I/O requests rather than the resources of a single storage virtualization controller.

Regardless of the mode, a basic functionality of a redundant storage virtualization computer system is that when one storage virtualization controller therein has some troubles, the other storage virtualization controller can take over the tasks of the troubled one, such as continuing the data access to the direct access storage devices. An inter-controller communication channel ICC must be provided between the storage virtualization controllers to establish a redundant storage virtualization computer system, thereby transmitting messages therebetween via inter-controller communication channel ICC. In addition, each storage virtualization controller always share the current task conditions or status of the other, that is, the two storage virtualization controllers are almost in synchronization and the data in each are almost the same.

Each storage virtualization controller follows up work status of peer controllers (the other storage virtualization controllers), and maintains data synchronization between all peer controllers. A storage virtualization controller informs the peer controllers when a change occurs in the memory of the storage virtualization controller, thereby providing data synchronization between all controllers. Therefore, the frequent data transfer on the inter-controller communication channel ICC would possibly increase the workload of the CPU in the storage virtualization controller is high, which in turn would degrade the system performance. Thus there is a need to resolve the heavy load of data transfer on the inter-controller communication channel ICC.

BRIEF SUMMARY OF THE INVENTION

A detailed description is given in the following embodiments with reference to the accompanying drawings.

According to the invention, a method of transmitting data between storage virtualization controllers in a computer system, the method comprising the steps of: a central processing unit (CPU) of a first storage virtualization controller (SVC) sending a direct data transfer request to a CPU chipset of the first SVC; and a first interface in the CPU chipset reading the direct data transfer request, in which the first interface is coupled to a second virtualization controller through a communication channel, and transfers the direct data transfer request to the second virtualization controller via the communication channel, wherein a second interface in the second virtualization controller receives the direct data transfer request.

According to another embodiment of the present invention, a storage virtualization controller, comprising: a CPU; a memory for storing data; and a CPU chipset coupled to the CPU and the memory; wherein the CPU sends a direct data transfer request to another storage virtualization controller via the CPU chipset to directly access data in a second memory of the another storage virtualization.

According to still another embodiment of the present invention, a storage virtualization subsystem, comprising: a first and a second storage virtualization controllers (SVCs); and a communication channel provided between the SVCs for exchanging information; wherein a CPU of the first SVC transmits a direct data transfer request through the communication channel so as to perform direct data access on a memory of the second SVC.

According to a further embodiment of the present invention, a storage virtualization computer system, comprising: a host entity for sending an input/output (I/O) requests; a first and a second SVCs which are coupled to the host entity for performing operations in response to the I/O requests; and a communication channel provided between the SVCs for allowing the SVCs to exchange information therebetween; and a plurality of physical storage devices coupled to the SVCs to provide data storage space for the host entity; wherein a CPU of the first SVC sends, through the communication channel, a direct data transfer request to the second SVC, to perform direct data access on a memory of the second storage virtualization controller.

According to another embodiment of the invention, a storage virtualization controller is also provided, comprising a CPU, a memory, and a CPU chipset. The CPU is a core of the storage virtualization controller. The memory stores data. The CPU chipset is coupled to the CPU and the memory. The CPU sends a data transfer request to other storage virtualization controllers via the CPU chipset to access data directly.

According to yet another embodiment of the invention, a storage virtualization subsystem is disclosed, comprising two storage virtualization controllers and a plurality of physical storage devices. The two storage virtualization controllers comprise a communication channel therebetween. The plurality of physical storage devices are coupled to the two storage virtualization controllers to provide data storage space. One of the two storage virtualization controllers sends a data transfer request to the other storage virtualization controller to access data in memory thereof.

According to yet another embodiment of the invention, a storage virtualization computer system is disclosed, comprising a host entity, two storage virtualization controllers, and a plurality of physical storage devices. The host entity sends an input/output (I/O) request. The two storage virtualization controllers are coupled to the host entity, perform an I/O operation corresponding to the I/O request, and comprise a communication channel therebetween. The plurality of physical storage devices are coupled to both storage virtualization controllers to provide data storage space. One of the two storage virtualization controllers sends a data transfer request to the other storage virtualization controller, to access data in memory thereof.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is the best-contemplated mode of carrying out the invention. This description is made for the purpose of illustrating the general principles of the invention and should not be taken in a limiting sense. The scope of the invention is best determined by reference to the appended claims.

Figure 1:
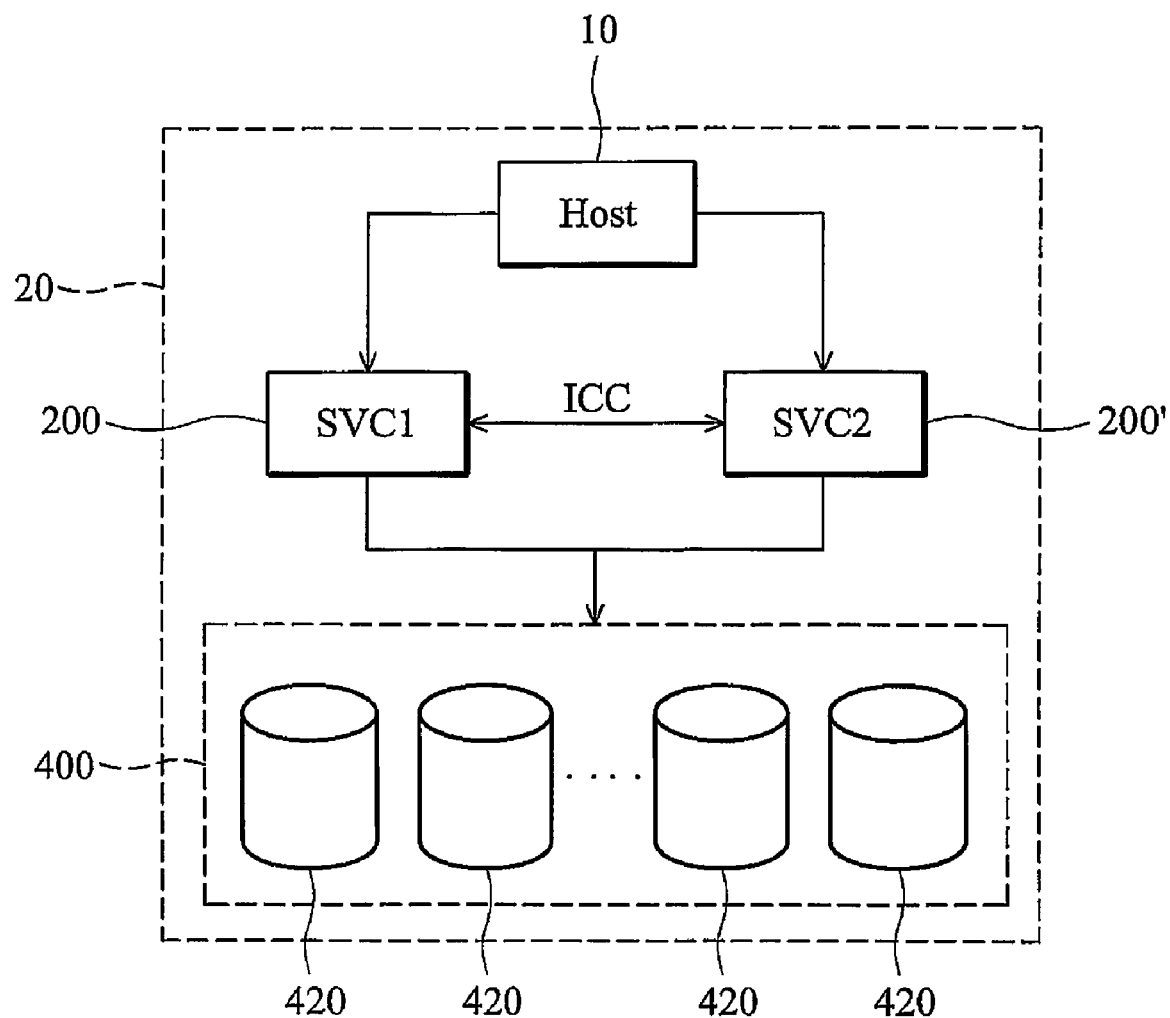
FIG. 1 is a block diagram of an exemplary storage virtualization computer system.

FIG. 1 is a block diagram of an exemplary storage virtualization computer system of the invention, comprising a host entity 10 and a storage virtualization subsystem (SVS) 20. The storage virtualization subsystem 20 comprises a first storage virtualization controller (SVC1) 200 and a second storage virtualization controller (SVC2) 200', both of which form a redundant storage virtualization controller pair, and a plurality of physical storage devices 420. The first storage virtualization controller (SVC) 200 and the second storage virtualization controller 200' can be a RAID (Redundant Array of Independent Disks) controller or a JBOD ("Just a Bunch of Disks") emulator.

Although in FIG. 1, there is only one host entity 10 which is coupled to the storage virtualization sub-system 20, in practice, there can be multiple host entities 10 which are coupled to only one SVS 20, or there can be multiple host entities 10 which are coupled to multiple SVSs 20. The host entity 10 can be a host computer such as a server computer system, workstation, personal computer system, or other related computers. The host entity 10 can also be another storage virtualization controller.

In an embodiment, all physical storage devices 420 in the storage virtualization subsystem 20 can form a physical storage device array 400.

An inter-controller communication channel ICC is provided between the first storage virtualization controller 200 and the second storage virtualization controller 200' in storage virtualization subsystem 20 for exchanging messages and data therebetween.

Figure 2A:
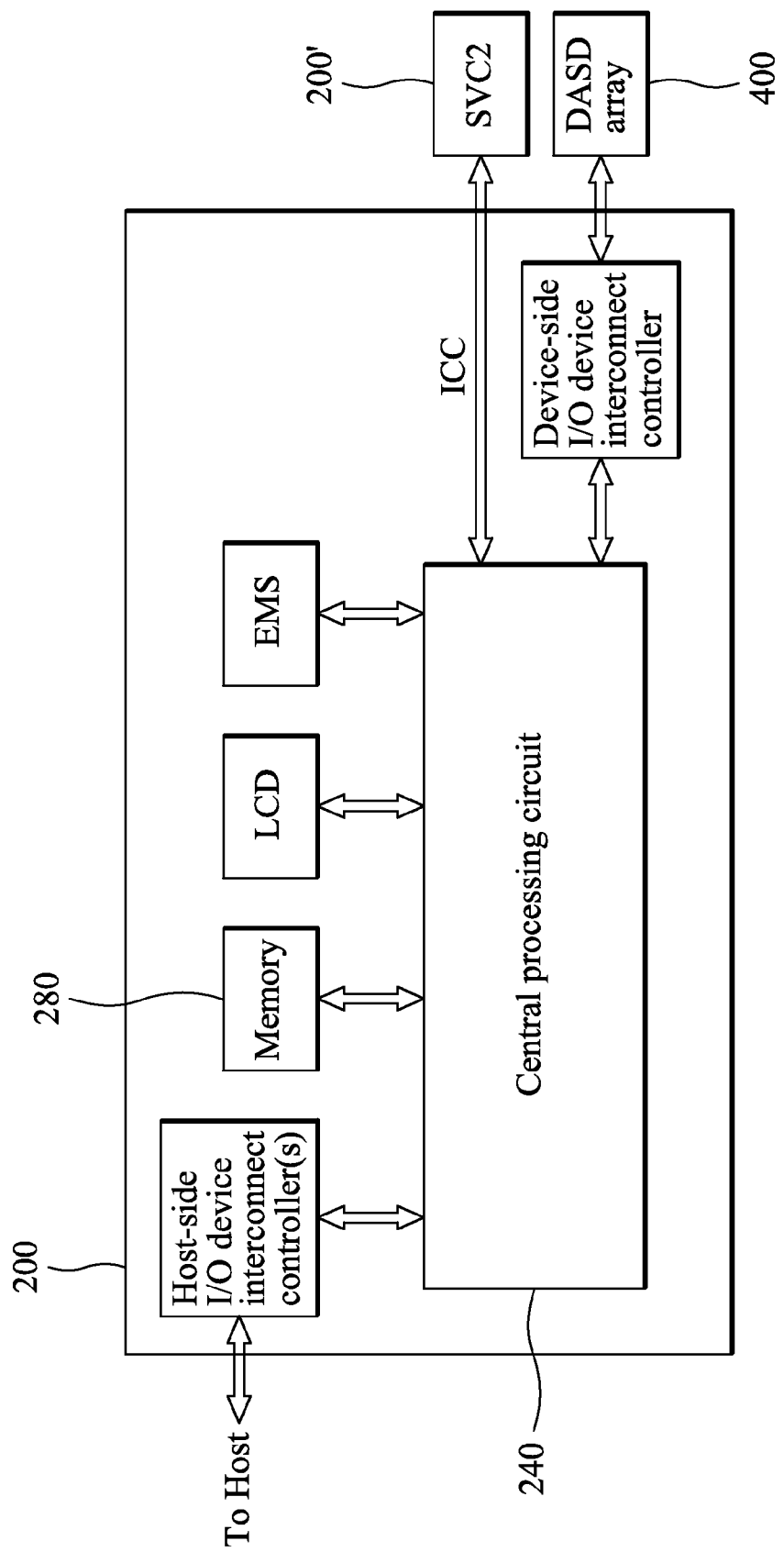
FIGS. 2A and 2B are block diagrams of two exemplary storage virtualization controllers in FIG. 1 respectively.
Figure 2B:
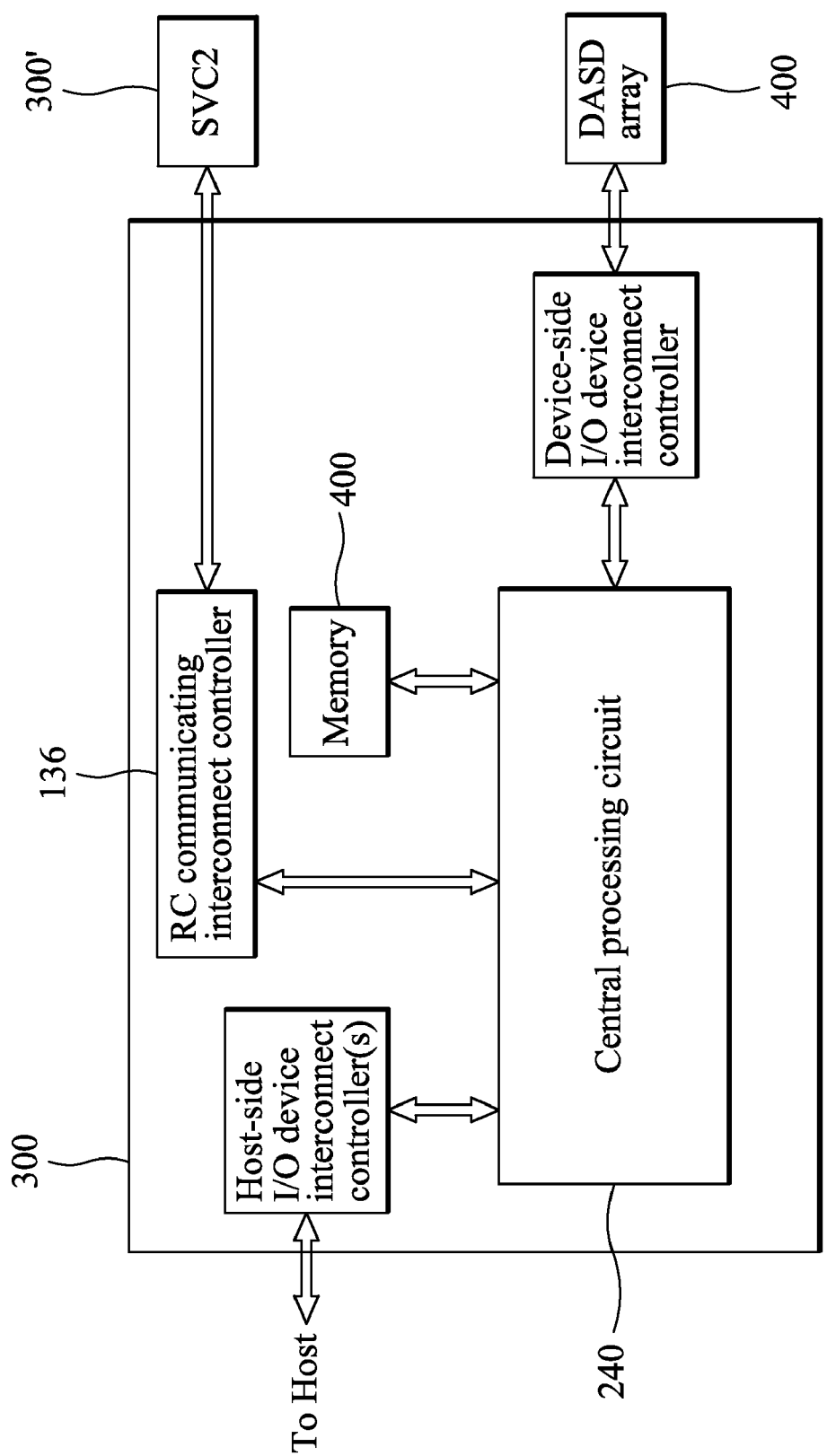

FIGS. 2A and 2B are block diagrams of two exemplary storage virtualization controllers in FIG. 1, respectively. Although FIGS. 2A and 2B only take the first storage virtualization controller SVC1 (200, 300) for an example to describe the present invention, in practice, the second storage virtualization controller SVC2 (200', 300') can be constructed in the same or in a similar manner.

Figure 3:
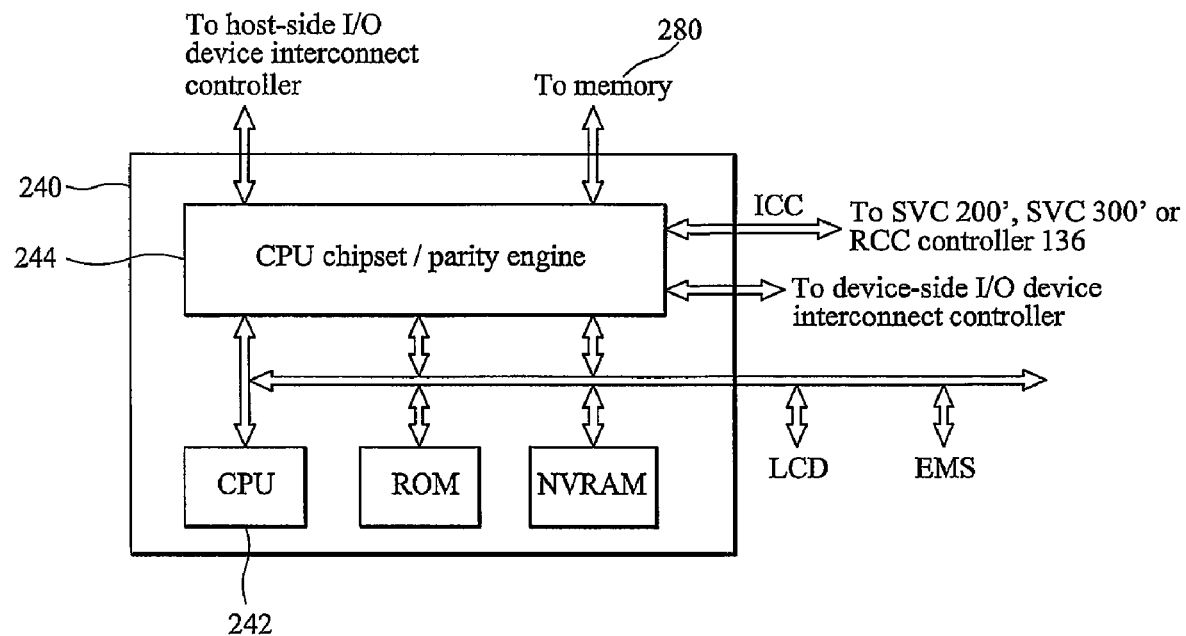
FIG. 3 is a block diagram of an exemplary central processing circuit 240 in FIG. 2A and 2B.

The primary difference between these two figures is that FIG. 2A is a block diagram of an exemplary storage virtualization controller which utilizes a local bus, such as a PCI-EXPRESS bus, as the inter-controller communication channel ICC, while FIG. 2B is a block diagram of an exemplary storage virtualization controller which utilizes an external bus such as an FC-AL (Fiber Channel-Arbitrated Loop), Small Computer System Interface (SCSI), Serial Advanced Technology Attachment (SATA), or Serial-Attached SCSI (SAS) as the inter-controller communication channel ICC. Thus, in FIG. 2B, a central processing circuit 240 utilizes the redundant controller communication (RCC) interconnect controller 136 as a buffer interface between the local bus in the storage virtualization controller 300 and an external ICC interconnect.):

FIG. 3 is a block diagram of an exemplary central processing circuit 240 in FIG. 2A and 2B, comprising a central processing unit (CPU) 242, read only memory (ROM), non-volatile random access memory (NVRAM), and CPU chipset/parity engine 244. The CPU 242 is coupled to other electronic components such as memory 280 through the CPU chipset/parity engine 244. In practical implementation, the CPU chipset and parity engine can be on different chips, although, in the present embodiment, the CPU chipset/parity engine 244 is integrated in a block diagram as shown.

Figure 4:
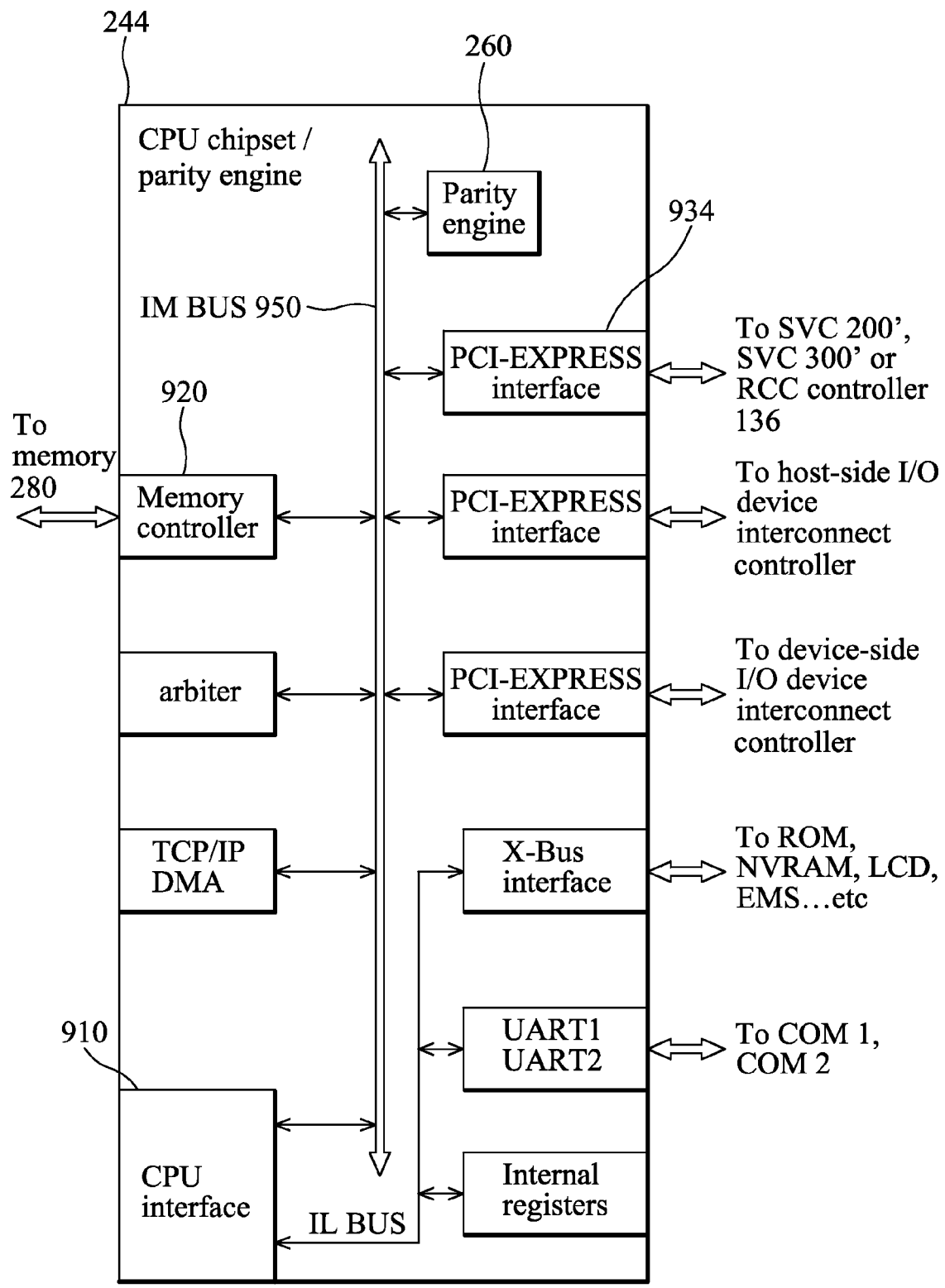
FIG. 4 is a block diagram of an exemplary CPU chipset/Parity Engine 244 in FIG. 3.

FIG. 4 is a block diagram of an exemplary CPU chipset/parity engine 244 in FIG. 3. In the embodiment, a PCI-EXPRESS interface 934 in the CPU chipset/parity engine 244 interfaces is the interface utilized to form the inter-controller communication channel ICC between the SVCs, for coupling to a PCI-EXPRESS interface in the second storage virtualization controller 200'. The PCI-EXPRESS interface 934 in the first storage virtualization controller 200 can be, depending on the design philosophy, directly coupled to the PCI-EXPRESS interface in the second storage virtualization controller 200' by directly utilizing a PCI-EXPRESS local bus on each side to form the inter-controller communication channel ICC, or can be coupled to the RCC interconnect controller 136 first and then coupled to the second storage virtualization controller 200' through the external interconnect.

When the storage virtualization subsystem 20 is switched on, the CPU chipset in each storage virtualization controller will try to recognize what devices are coupled thereto, and will determine whether connections between them are established successfully, both of which are through it's PCI-EXPRESS interface. Therefore, when the inter-controller communication channel ICC between the first storage virtualization controller 200 and the second storage virtualization controller 200' is established, the PCI-EXPRESS interface 934 can recognize that the second storage virtualization controller 200'is connected thereto, and can further identify that the interface 934 is the interface which establishes the inter-controller communication channel ICC.

Figure 5:
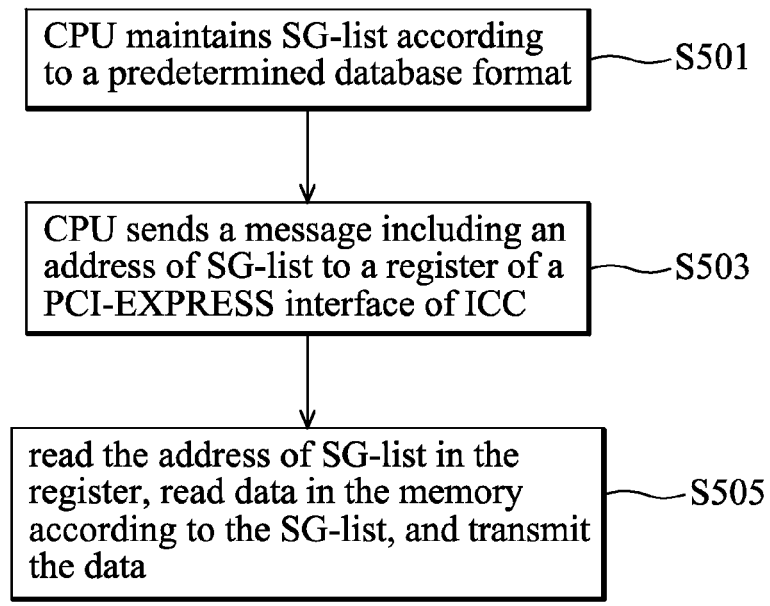
FIG. 5 is a flowchart that shows a method of data transfer.

FIG. 5 shows a method of data transfer disclosed in U.S. patent application Ser. No. 11/330,961, comprising primarily the steps of: a CPU establishing a corresponding Scatter-Gather (SG) list for data to be transmitted to another storage virtualization controller according to a pre-defined database format (Step S501), and the CPU transmitting a message including an address of the SG-List, to a register of an ICC interface that establishes the inter-controller communication channel ICC (Step S503). Because the register belongs to the ICC interface, the ICC interface is triggered to read the message in the register, reads the SG list according to the address in the message, performs an operation based on instructions in the fields of the SG list, and accesses data in a memory of the other storage virtualization controller (Step S505).

According to the method in FIG. 5, during executing redundant data transfer operations, the CPU maintains the SG-list and transmits the first SG-List address thereof to a CPU chipset, and the CPU chipset performs subsequent data reading and transfer operations.

However, the method in FIG. 5 is not economic for small data transfer. For example, if there is only 1 byte data to be transmitted, because the CPU may use as many as 16 bytes in the memory to establish, according to the pre-defined database format, the SG list, and the CPU chipset still needs to read the SG-list and then processes the content of the SG-list, the method in FIG.5 is not economic for small data transfer. Thus, in order to increase the performance of the whole system, a further method of small data transfer between the SVCs according to the present invention is provided.

Figure 6:
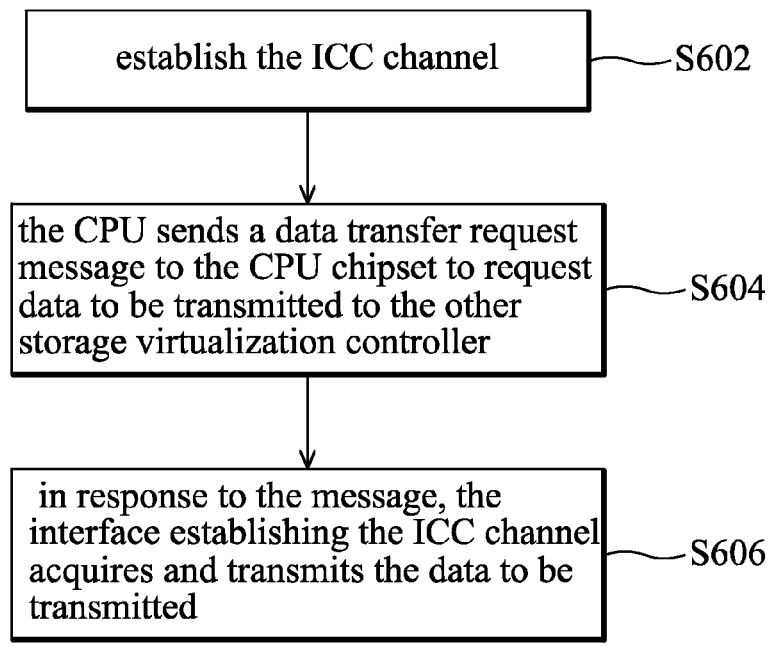
FIG. 6 is a flowchart of an exemplary small data transfer method between two storage virtualization controllers according to the invention.

FIG. 6 is a flowchart which shows an exemplary method of small data transfer between two storage virtualization controllers according to the invention. Upon establishing the inter-controller communication channel ICC between the two storage virtualization controllers (Step S602); if the CPU in one of the storage virtualization controllers sends a data transfer information to the other SVC, then the CPU directly transmits the data to the CPU chipset (Step S604); the CPU chipset transmits the data to the other storage virtualization controller in response to the message (Step S606), and the other storage virtualization controller processes the data upon receipt of it.

Please refer to FIG. 4. According to the method of the present invention, when the CPU needs to transmit the data to the second SVC, then in practice, the method of data transfer is achieved by the fact that the CPU 242 transmits the data to be transmitted to the other end through a CPU interface 910 to an IM bus 950, in which the data is then read by the PCI-E interface 934 that establishes the communication channel between the SVCs, and is transmitted to the second SVC 200'. Moreover, when the PCI-E interface 934 of an SVC, for example the first SVC, receives the data transmitted from the other SVC, for example the second SVC, the data is transmitted through the IM BUS950 to a memory controller 920, and is then stored into a memory 280.

The aforesaid data transfer request comprises a determination message, such that after the CPU interface 910 asserts the data transfer request on IM BUS 950, the PCI-Express interface 934 recognizes and further reads the data.

In one embodiment, first of all, each storage virtualization controller regards the memory of the other redundant storage virtualization controller as an extension of its memory. If memory capacities of the first and the second storage virtualization controllers each are 2 Giga bytes(2G), then each storage virtualization controller has a physical memory of 2G with the corresponding physical memory addresses from 0000_0000 to 7FFF_FFFF, and regards the memory addresses of the other redundant storage virtualization controller as 8000_0000 to FFFF_FFFF. In the embodiment, the memory address of the other storage virtualization controller is directly concatenated to its local memory address, i.e., one storage virtualization controller regards memory address A of the other redundant storage virtualization controller as virtual memory address 2 G+A. In fact, an indirect concatenation of the virtual memory address can also be employed, such as, regarding memory address A of the other redundant storage virtualization controller as virtual memory address 3 G+A. Although here, the memories having the same capacities in the two SVCs are taken for example, in practice, the capacities of the memories in the two SVCs can be different, such as, the memory capacity of the first SVC can be 2 G, and that of the second SVC can be 1 G; moreover, the physical or virtual memory address depends on the memory capacity as well. In addition, according to the present invention, the SVCs are set up such that partial or full memory capacity of one storage virtualization controller can be accessible by the other.

Provided that one storage virtualization controller writes a data into memory address 2100_0000 of the other storage virtualization controller, then the CPU 242 will transfer the destination start address (A100_0000) into which the data is written and the data to be written, to the CPU interface 910, and the CPU interface 910 sends the destination start address A100_0000 and the data, to the IM BUS 950, both of which are read by the PCI-EXPRESS interface 934 that is coupled to the other storage virtualization controller. Because the destination start address in the message transferred from the CPU 910 is a virtual address that is directed to the other virtualization controller, and in CPU chipset 244, the PCI-EXPRESS interface 934 is the only interface designed to communicate with the other storage virtualization controller, the message can be judged by the electronic devices connected to the IM BUS 950 in the chipset and can be recognized by the interface that establishes the inter-controller communication channel ICC, and the interface reads and executes the data transfer, i.e., utilizing the destination start address that is represented by the virtual memory address as a determination message.

In the present embodiment, after the PCI-EXPRESS interface 934 that establishes the inter-controller communication channel ICC reads the destination start address A100_0000 and the data to be written, the PCI-EXPRESS interface 934 converts the destination start address A100_0000 into a corresponding physical memory address 2100_0000, and transfers it along with the data to be written, to the other storage virtualization controller. Then, when the other storage virtualization controller receives the physical memory address 2100_0000 and the data to be written, it writes the data into the physical memory address 2100_0000.

In another embodiment, converting the destination start address into the physical memory address step is performed by the interface of the receiving storage virtualization controller; that is, the PCI-EXPRESS interface 934 that establishes the inter-controller communication channel ICC transmits the destination start address A100_0000 and data to be written, to the other storage virtualization controller. Then the storage virtualization controller converts the destination start address A100_0000 (virtual memory address) into a corresponding physical memory address 2100_0000, and writes the data into the physical memory address 2100_0000.

In addition to the aforesaid embodiment which utilizes the virtual address to represent the destination start address as the determination message, in still another embodiment which utilizes the destination start address as the determination message, each storage virtualization controller provides partial or full memory space accessible by the other redundant SVC, and defines a start address of the provided memory space as a base address. An access address transmitted by the other redundant storage virtualization controller is an offset address of the memory address. When the storage virtualization controller receives the offset address transmitted from the other SVC, it adds the offset address to the base address in order to produce the access address that represents an actual access destination memory address. The storage virtualization controller that delivers the data transfer request presents the offset address through the virtual memory address; similarly, the virtual memory address is configured in a manner that it does not overlap the local physical memory address, such that the local interface that establishes the inter-controller communication channel ICC, can identify the virtual memory address.

For example, if the memory capacities of the first and the second storage virtualization controller storage virtualization controllers are 2 Giga bytes(2G), then the physical memory address of 2G of each storage virtualization controller is 0000_0000 to 7FFF_FFFF, and the second storage virtualization controller defines 1000_0000 base address. The first storage virtualization controller presents the offset address B to be accessed, of the memory in the second storage virtualization controller in 2G+B manner, so that the offset address is distinguishable from the local memory address. When the first storage virtualization controller accesses the offset address 0100 of the second storage virtualization controller, the CPU 242 transfers the offset address 8000_0100(a virtual memory address, that is, 2G +0100 address) and data to be written, to the CPU interface 910, and the CPU interface 910 forwards the offset address 8000_0100 and the data to be written, to the IM BUS 950. Because the offset address in the message does not fall into the range of local physical memory address, the memory controller 920 and PCI-EXPRESS interface 934 may judge it, and only the PCI-EXPRESS interface 934 that establishes the inter-controller communication channel ICC can read the offset address and the data, and perform the data transfer.

In the present embodiment, after the PCI-EXPRESS interface 934 that establishes the inter-controller communication channel ICC reads the virtual offset address 8000_0100 and the data to be written, the PCI-EXPRESS first converts the virtual offset address 8000_0100 into a corresponding physical offset address 0100, and sends it along with the data to be written, to the other storage virtualization controller. Upon reception of the offset address 0100 and the data to be written by the other storage virtualization controller, it adds the offset address 0100 and base address 1000_0000 to produce address 1000_0100, and writes the data into the physical memory address 1000_0100.

In still another embodiment, conversion of the virtual address into the corresponding physical address is performed by the interface of the receiving storage virtualization controller; that is, the PCI-EXPRESS interface 934 that establishes the inter-controller communication channel ICC transmits the virtual offset address 8000_0100 and data to be written, to the other storage virtualization controller. When the PCI-EXPRESS interface of the other storage virtualization reads the virtual offset address 8000_0100 and the data to be written transmitted from the transmitting storage virtualization controller, the PCI-EXPRESS interface converts the virtual offset address 8000_0100 into a corresponding physical offset address 0100, which is then added into the base address 1000_0000, so as to produce a physical offset address 1000_0100, and writes the data into the physical offset address 1000_0100.

Preferably, the technologies of the aforesaid embodiments are applied to direct transmission of the data in the cache. Since the CPU only has to present the access destination as a virtual memory address, the rest of the operations is almost identical to the CPU's transmitting the data in the cache to its own memory.

According to the present invention, when the two storage virtualization controllers establish the inter-controller communication channel ICC therebetween, each one storage virtualization controller regards the other redundant SVC as an end device, thereby data access of the memory of the terminal device can be performed by the one storage virtualization controller. Therefore, in addition to transmitting and writing the data into the other redundant storage virtualization controller, the one storage virtualization controller can also access the data in the memory of the other redundant storage virtualization controller.

When it is designed that the one storage virtualization controller can directly perform the read and write operations on the memory of the other, then the data transmission request transmitted from the CPU of the one storage virtualization must include a data accessing instruction (a reading instruction or a writing instruction) for indicating performing of the write and read operations.

The write operation is described in the previous embodiments; moreover, for the read operation, the data transfer request further comprises a data source start address (or start offset address) and data length. Similarly, because the data source start address is a virtual address, the interface that establishes the inter-controller communication channel ICC reads, processes and delivers the request to the other storage virtualization controller. Upon receiving a return message from the other storage virtualization controller, the storage virtualization controller forwards the return message to the CPU.

When the interface in the CPU chipset establishing the inter-controller communication channel ICC interface receives a data transfer request from the other storage virtualization controller, it parses the reading instruction or the writing instruction in the data transfer request and further determines a corresponding read operation or write operation. For the write operation, the write operation is described above. If it is a read operation, then data in the other storage virtualization controller is read according to the data source start address and the data length, and is then returned to the requester, in which the data source start address may also be generated by combining the offset address and the base address. The aforesaid entire read operation or write operation is performed by the CPU chipset itself. The conversion of the virtual memory address into a corresponding physical memory address in the data transfer request can be performed by the interfaces that establish the inter-controller communication channel ICC, either at the transmitting end or receiving end or both. That is, the CPU delivers a data transfer request to the CPU chipset, and the interface that establishes the inter-controller communication channel ICC, reads and transfers the data transfer request to the other storage virtualization controller, and thus, the CPU does not need to establish a SG-list corresponding to the data.

When the interface that establishes the inter-controller communication channel ICC receives the data from the other storage virtualization controller, the entire data access operation (for example, read or write operation) to the memory is performed by the CPU chipset.

In the invention, each storage virtualization controller can perform data access operations to the other redundant storage virtualization controller, so that when one SVC recovers from a failure in which its job is taken over by the other SVC, the one SVC can directly access to the memory of the other SVC, or the other SVC may actively transmit relevant information to the one SVC, so as to make the one SVC obtain and understand operating status and progress information of the other SVC, and continues processing the relevant jobs. Moreover, the memory of the other storage virtualization controller can be regarded as an extension of the local memory of the one SVC.

According to the aforesaid method, since the CPU does not establish a SG-list for the data, efficiency is improved for small data transfer, and the method is especially useful for transferring data of the CPU cache. In one embodiment, the transmission of data achieved by the SG-List approach can be incorporated into the present invention, so that each storage virtualization controller can determine, based on data amount or data source (from the memory or from the CPU cache), whether to utilize the SG-list or to utilize the direct data accessing for transferring data to the other storage virtualization controller, and that the performance of the system can be optimized. For example, in data transmitting, the direct data accessing approach is utilized when the data amount is lower than a specific amount, while the SG-list approach is utilized when the data amount is higher than a specific amount. In another example, in data transmitting, the direct data accessing approach is utilized when the data source is a CPU cache, while the SG-list approach is utilized when the data source is a memory other than a CPU cache.

In conclusion, a method of data transfer between the redundant storage virtualization controllers is provided in the present invention, in which after establishing the inter-controller communication channel ICC between the two storage virtualization controllers, the CPU in each storage virtualization controller can deliver, through the ICC directly, a data transfer request without preparing the SG-list first.

While the invention has been described by way of example and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of transmitting data between storage virtualization controllers in a computer system, the storage virtualization controllers comprising a first storage virtualization controller (SVC) and a second SVC, in which the first SVC comprises a first central processing unit (CPU), a first CPU chipset, a first interface and a first memory, and the second SVC comprises a second CPU, a second CPU chipset, a second interface and a second memory, the method comprising the steps of:

the first CPU of the first SVC sending a direct data transfer request to the first CPU chipset of the first SVC;

the first interface in the first CPU chipset reading the direct data transfer request from a CPU interface in the first CPU chipset, in which the first interface is coupled to the second SVC through an inter-controller communication channel, and transfers the direct data transfer request to the second SVC via the inter-controller communication channel, wherein the second interface in the second interface in the second SVC receives the direct data transfer request; and the direct data transfer request comprising a virtual address obtained by converting from one of a start address and an offset address of an access destination such that the first interface recognizes, through the virtual address, the direct data transfer request, and the first interface performs direct data access to the second memory of the second SVC.

2. The method of claim 1, wherein the first and the second interfaces comply with a Peripheral Component Interconnect Express protocol, the inter-controller communication channel complies with the Peripheral Component Interconnect Express protocol, and the first and the second interfaces are connected via the inter-controller communication channel.

3. The method of claim 1, wherein the second interface is located in the second CPU chipset of the second SVC.

4. The method of claim 3, wherein the first and the second interfaces comply with a Peripheral Component Interconnect Express protocol, the inter-controller communication channel complies with the Peripheral Component Interconnect Express protocol, and the first and the second interfaces are connected via the inter-controller communication channel.

5. The method claim 1 further comprises steps of:
the CPU interface asserting the direct data transfer request into an internal main bus in the first CPU chipset; and
the first interface reading the direct data transfer request.

6. The method of claim 1, wherein the second SVC further comprises the steps of:
defining a base address which is defined as a start memory address in the second memory of the second SVC for the first SVC to access data; and
combining the base address and the offset address to obtain a start address of the access destination.

7. The method of claim 1, further comprising the step of converting the virtual address into a corresponding physical address.

8. The method of claim 1, wherein the direct data transfer request comprises an data accessing instruction for instructing to perform a read operation or write operation.

9. A storage virtualization controller (SVC), comprising:
a first CPU;
a first memory for storing data;
a first CPU chipset coupled to the first CPU and the first memory; and
a first local bus interface in the first CPU chipset for coupling to a second local bus interface of a second SVC, in which the first CPU sends a direct data transfer request to the second SVC via the first local bus interface of the first CPU chipset to directly access data in a second memory of the second SVC via the second local bus interface of the second SVC through an inter-controller communication channel, and the direct data transfer request comprises a virtual address obtained by converting from one of a start address and an offset address of an access destination, such that the first local bus interface recognizes, through the virtual address, the direct data transfer request, and the first local bus interface performs direct data access to the second memory of the second SVC.

10. The controller of claim 9, wherein the first CPU transmits the direct data transfer request to the second SVC through the first CPU chipset, so as to perform direct data access on the second memory of the second SVC through a second CPU chipset of the second SVC.

11. The controller of claim 10, wherein the first CPU chipset comprises:
a CPU interface coupled to the first CPU for being an interfaces between the first CPU and electronic devices in the first CPU chipset;
a memory controller coupled to the first memory for being an interface between the first memory and the electronic devices in the first CPU chipset;
the first local bus interface for being an interface which communicates with the second SVC; and
an internal main bus communicating data signals and control signals between the electronic devices in the first CPU chipset;
wherein the direct data access is performed through the first local bus interface.

12. The controller of claim 11, wherein the first local bus interface complies with a Peripheral Component Interconnect Express protocol, and the first local bus interface is coupled to the second SVC via the communication channel which complies with the Peripheral Component Interconnect Express protocol.

13. A storage virtualization subsystem, comprising:
a first virtualization controller SVC and a second SVC, in which the first SVC comprises a first central processing unit
(CPU), a first CPU chipset, a first local bus interface and a first memory, and the second SVC comprises a second CPU, a second CPU chipset, a second local bus interface and a second memory;
an inter-controller communication channel provided between the SVCs for exchanging information; and
the first CPU of the first SVC for transmitting a direct data transfer request through the inter-controller communication channel so as to perform direct data access on the second memory of the second SVC, in which the direct data transfer request comprises a virtual address obtained by converting from one of a start address and an offset address of an access destination such that the first local bus interface recognizes, through the virtual address, the direct data transfer request, and the first local bus interface reads the direct data transfer request to the second memory of the second SVC.

14. The subsystem of claim 13, wherein the first SVC and the second SVC respectively comprise the first and the second CPU chipset, and the first and the second CPU chipsets respectively comprises the first local bus interface and the second local bus interface which are coupled to the communication channel, and the direct data access is performed by the local bus interfaces.

15. The subsystem of claim 13, wherein the communication channel between the first SVC and second SVC complies with a Peripheral Component Interconnect Express protocol.

16. The subsystem of claim 13, further comprising a plurality of physical storage devices coupled to the first SVC and second SVC to provide data storage space.

17. A storage virtualization computer system, comprising:
a host entity for sending an input/output (I/O) requests;
a first storage virtualization controller (SVC) and a second SVC which are coupled to the host entity for performing operations in response to the I/O requests, in which the first SVC comprises a first central processing unit (CPU), a first CPU chipset, a first local bus interface and a first memory, and the second SVC comprises a second CPU, a second CPU chipset, a second local bus interface and a second memory;
an inter-controller communication channel provided between the SVCs for allowing the SVCs to exchange information therebetween;
a plurality of physical storage devices coupled to the SVCs to provide data storage space for the host entity; and
the first CPU of the first SVC for sending, through the inter-controller communication channel, a direct data transfer request to the second SVC, to perform direct data access on the second memory of the second SVC, in which the direct data transfer request comprises a virtual address obtained by converting from one of a start address and an offset address of an access destination such that the first local bus interface recognizes, through the virtual address, the direct data transfer request, and the first local bus interface reads the direct data transfer request, in which the virtual address is directed to the second memory of the second SVC.

18. The computer system of claim 17, wherein the first SVC and the second SVC respectively comprise the first and the second CPU chipset, and the first and the second CPU chipsets respectively comprises the first local bus interface and the second local bus interface which are coupled to the communication channel, and the direct data access is performed by the local bus interfaces.

19. The computer system of claim 17, wherein the communication channel between the SVCs complies with a Peripheral Component Interconnect Express protocol.

* * * * *